United States Patent
Hirotomi et al.

(10) Patent No.: US 9,365,259 B2
(45) Date of Patent: Jun. 14, 2016

(54) DISC BRAKE CALIPER

(71) Applicant: SHIMANO INC., Sakai (JP)

(72) Inventors: Shinya Hirotomi, Sakai (JP); Takefumi Terada, Sakai (JP); Takaaki Fujiwara, Sakai (JP); Takahiro Yamashita, Sakai (JP)

(73) Assignee: SHIMANO INC., Sakai (JP)

( * ) Notice: Subject to any disclaimer, the term of this patent is extended or adjusted under 35 U.S.C. 154(b) by 89 days.

(21) Appl. No.: 14/141,346

(22) Filed: Dec. 26, 2013

(65) Prior Publication Data

US 2015/0183488 A1    Jul. 2, 2015

(51) Int. Cl.
| | | |
|---|---|---|
| *B62L 3/00* | (2006.01) | |
| *F16D 65/00* | (2006.01) | |
| *F16D 55/228* | (2006.01) | |
| *F16D 65/18* | (2006.01) | |
| *F16D 121/04* | (2012.01) | |

(52) U.S. Cl.
CPC .................. *B62L 3/00* (2013.01); *F16D 55/228* (2013.01); *F16D 65/0068* (2013.01); *F16D 65/0075* (2013.01); *F16D 65/18* (2013.01); *F16D 2121/04* (2013.01)

(58) Field of Classification Search
CPC ... F16D 65/0068; F16D 65/0081; B62L 3/00; B62L 1/00; B62L 1/005
See application file for complete search history.

(56) References Cited

U.S. PATENT DOCUMENTS

| | | | | |
|---|---|---|---|---|
| 5,503,252 | A * | 4/1996 | Gelbein | 188/24.22 |
| 7,537,094 | B1 * | 5/2009 | Kato | 188/24.13 |
| 2005/0006186 | A1 * | 1/2005 | Iwai et al. | 188/26 |
| 2006/0231351 | A1 * | 10/2006 | Kariyama | 188/26 |
| 2013/0048444 | A1 | 2/2013 | Hirotomi et al. | |

FOREIGN PATENT DOCUMENTS

DE    10 2012 214 135    2/2013

OTHER PUBLICATIONS

German Search Report for corresponding DE Application No. 10 2014 118 396.7, Aug. 7, 2015.

* cited by examiner

*Primary Examiner* — Vishal Sahni
(74) *Attorney, Agent, or Firm* — Mori & Ward, LLP

(57) ABSTRACT

A disc brake caliper comprises a caliper main body and an insert member. The caliper main body comprises a first portion, a second portion, a connecting portion, a first hole and a second hole. The connecting portion, the first portion and the second portion are formed as a single unitary member. A banjo fixing member is to be attached to the first hole. The second hole is provided apart from the first hole and extending from the first portion to the connecting portion so as to at least partially overlap the slit in the connecting portion. The insert member is configured to be inserted into the second hole. The insert member extends from the first portion to the connecting portion so as to at least partially overlap the slit in the second hole.

26 Claims, 16 Drawing Sheets

DISC BRAKE CALIPER

BACKGROUND OF THE INVENTION

1. Field of the Invention

The present invention relates to a disc brake caliper.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle brake device. In recent years, bicycles have been provided with disc braking devices including disc brake calipers.

SUMMARY OF THE INVENTION

In accordance with a first aspect of the present invention, a disc brake caliper comprises a caliper main body and an insert member. The caliper main body comprises a first portion, a second portion, a connecting portion, a first hole and a second hole. The second portion faces the first portion. The connecting portion connects the first portion with the second portion such that a slit is defined between the first portion and the second portion. The connecting portion, the first portion and the second portion are formed as a single unitary member. A banjo fixing member is to be attached to the first hole. The second hole is provided apart from the first hole and extending from the first portion to the connecting portion so as to at least partially overlap the slit in the connecting portion. The insert member is configured to be inserted into the second hole. The insert member extends from the first portion to the connecting portion so as to at least partially overlap the slit in the second hole.

In accordance with a second aspect of the present invention, the disc brake caliper according to the first aspect is configured so that the caliper main body is made of a first material. The insert member is made of a second material harder than the first material.

In accordance with a third aspect of the present invention, the disc brake caliper according to the second aspect is configured so that the first material comprises an aluminum alloy. The second material comprises one of iron, titanium and stainless steel.

In accordance with a fourth aspect of the present invention, the disc brake caliper according to the first aspect is configured so that the second hole extends from the first portion to the connecting portion beyond a center plane defined at the slit and dividing the slit into halves.

In accordance with a fifth aspect of the present invention, the disc brake caliper according to the fourth aspect is configured so that the insert member extends from the first portion to the connecting portion beyond the center plane in a state where the insert member is provided in the second hole.

In accordance with a sixth aspect of the present invention, the disc brake caliper according to the fourth aspect is configured so that the second hole extends from the first portion to the second portion through the connecting portion beyond the slit.

In accordance with a seventh aspect of the present invention, the disc brake caliper according to the sixth aspect is configured so that the insert member extends from the first portion to the second portion through the connecting portion beyond the slit in a state where the insert member is provided in the second hole.

In accordance with an eighth aspect of the present invention, the disc brake caliper according to the first aspect is configured so that the second hole has an inner diameter greater than an inner diameter of the first hole.

In accordance with a ninth aspect of the present invention, the disc brake caliper according to the first aspect is configured so that the caliper main body further comprises a first recess, a second recess and a fluid passage. The first recess is provided on the first portion to arrange a first piston, the first recess facing the slit. The second recess is provided on the second portion to arrange a second piston, the second recess facing the slit and the first recess. The fluid passage connects the first hole, the first recess and the second recess.

In accordance with a tenth aspect of the present invention, the disc brake caliper according to the ninth aspect is configured so that the second hole is configured without being in fluid communication with the fluid passage.

In accordance with an eleventh aspect of the present invention, the disc brake caliper according to the ninth aspect is configured so that the first recess defines a first movement axis along which the first piston moves. The second hole is configured to be parallel to the first movement axis.

In accordance with a twelfth aspect of the present invention, the disc brake caliper according to the eleventh aspect is configured so that the second recess defines a second movement axis along which the second piston moves, the second movement axis being coaxial with or parallel to the first movement axis.

In accordance with a thirteenth aspect of the present invention, the disc brake caliper according to the ninth aspect is configured so that the second hole is arranged at an opposite side of the first hole with respect to the first recess and the second recess.

In accordance with a fourteenth aspect of the present invention, the disc brake caliper according to the first aspect is configured so that the second hole includes an internal thread. The insert member includes an external thread and is configured to be screwed into the second hole.

In accordance with a fifteenth aspect of the present invention, the disc brake caliper according to the first aspect is configured so that the insert member is configured to be press-fitted into the second hole.

In accordance with a sixteenth aspect of the present invention, the disc brake caliper according to the first aspect is configured so that the insert member is configured to be detachably inserted into the second hole.

In accordance with a seventeenth aspect of the present invention, the disc brake caliper according to the first aspect is configured so that the second hole includes an end opening which is provided on the first portion, and a bottom opposite to the end opening.

In accordance with an eighteenth aspect of the present invention, the disc brake caliper according to the seventeenth aspect further comprises a fixing portion provided on the second portion and configured to be detachably fixed to a bicycle frame.

In accordance with a nineteenth aspect of the present invention, the disc brake caliper according to the first aspect is configured so that the insert member includes a shaft portion configured to be inserted into the second hole and to be at least partially a cylindrical shape.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
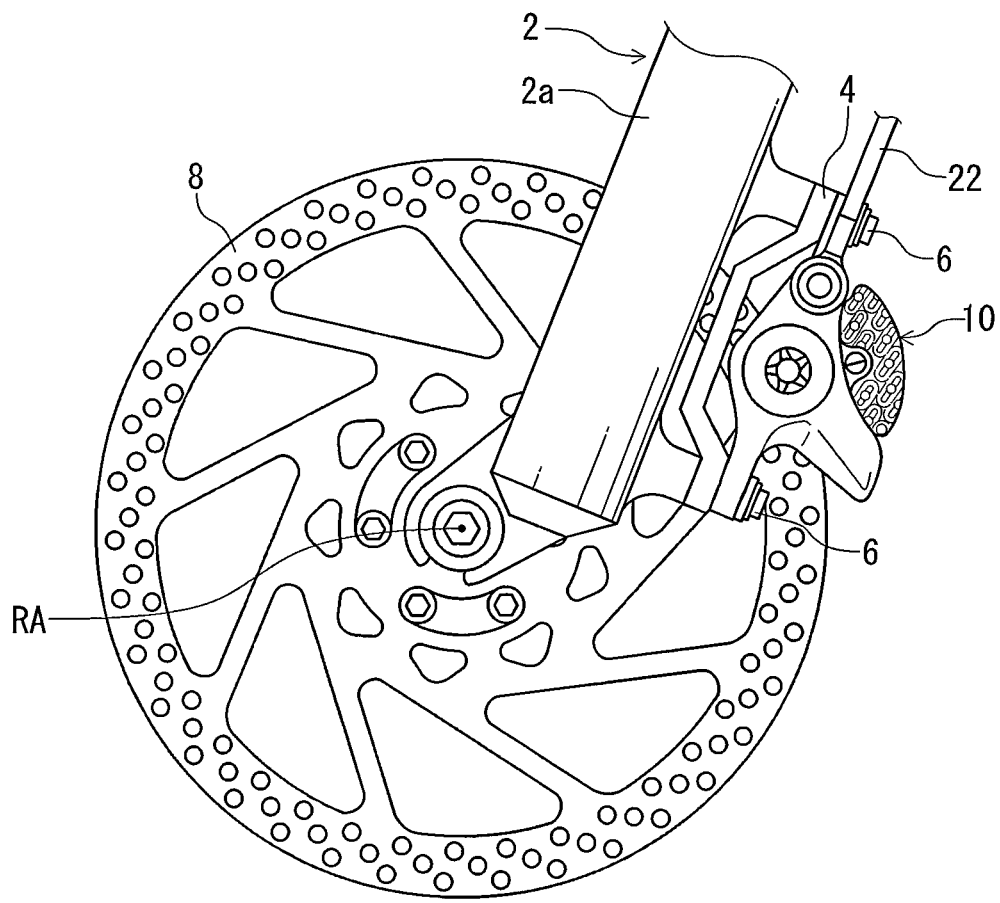
FIG. 1 is a partial side elevational view of a disc brake system including a disc brake caliper in accordance with a first embodiment.

The embodiments will now be described with reference to the accompanying drawings, wherein like reference numerals designate corresponding or identical elements throughout the various drawings.

First Embodiment

Referring initially to FIG. 1, a part of a bicycle is illustrated that a bicycle disc brake caliper (hereinafter, disc brake caliper) 10 in accordance with a first embodiment. The disc brake caliper 10 is mounted to a bicycle frame 2 by a bracket 4 using a pair of bolts 6. In the illustrated embodiment, the disc brake caliper 10 is a front brake and mounted to a front fork 2a of the bicycle frame 2. The disc brake caliper 10 can, however, be applied to a rear disc brake. The disc brake caliper 10 is constructed for selectively gripping (stopping rotation) of a disc rotor 8 that is fixedly attached to a bicycle hub assembly (not shown) of a bicycle wheel (not shown). The disc rotor 8 is rotatable relative to the front fork 2a about a rotational axis RA.

The disc brake caliper 10 is configured to be actuated by a hydraulic fluid provided from an operating device (not shown). Since a well-known and conventional brake lever can be applied as the operation device, the operating device will not be discussed and/or illustrated in detail herein for the sake of brevity.

In the present application, the following directional terms "front", "rear", "forward", "rearward", "left", "right", "transverse", "upward" and "downward" as well as any other similar directional terms refer to those directions which are determined on the basis of a rider who sits on a saddle (not shown) of a bicycle with facing a handlebar (not shown), for example. Accordingly, these terms, as utilized to describe the disc brake caliper 10, should be interpreted relative to the bicycle as used in an upright riding position on a horizontal surface.

Figure 2:
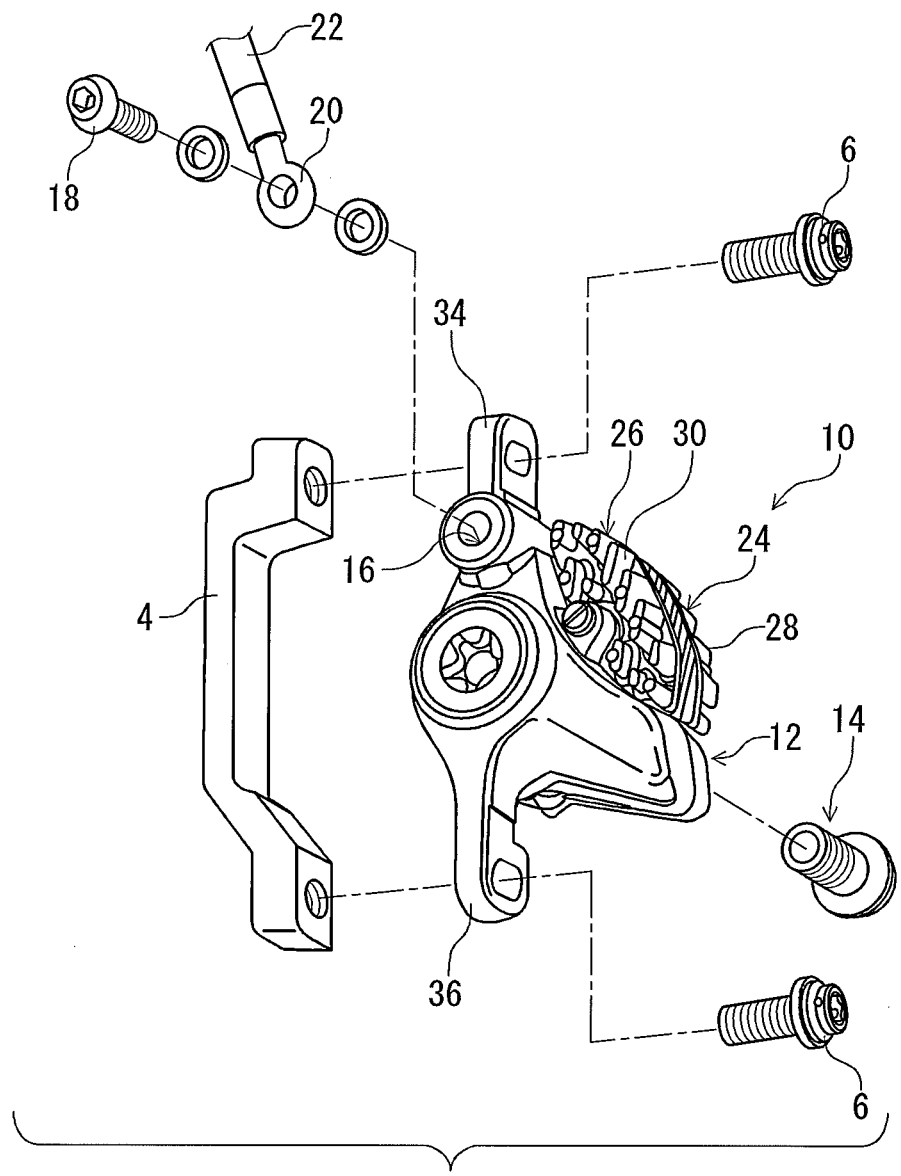
FIG. 2 is a partial exploded perspective view of the disc brake system including the disc brake caliper in accordance with the first embodiment.

As seen in FIG. 2, the disc brake caliper 10 comprises a caliper main body 12 and an insert member 14. The caliper main body 12 comprises a first hole 16 to which a banjo fixing member 18 is to be attached. A banjo 20 is coupled to an end of a hydraulic brake hose 22 and is fixed to the disc brake caliper 10 by the banjo fixing member 18. Thus, a master cylinder of the operating device (not shown) is connected to the disc brake caliper 10 via the hydraulic brake hose 22, the banjo 20 and the banjo fixing member 18. The insert member 14 will be described in detail later.

The disc brake caliper 10 comprises a first brake pad 24 and a second brake pad 26. The first brake pad 24 and the second brake pad 26 are movably mounted to the caliper main body 12. In the illustrated embodiment, the first brake pad 24 includes cooling fins 28 disposed outside the caliper main body 12. The second brake pad 26 includes cooling fins 30 disposed outside the caliper main body 12.

The disc brake caliper 10 further comprises a fixing portion 32 (FIG. 4) configured to be detachably fixed to the bicycle frame 2 (FIG. 1). The fixing portion 32 includes a first fixing part 34 and a second fixing part 36. The first fixing part 34 and the second fixing part 36 are fixed to the front fork 2a via the bracket 4 by using the bolts 6. In the illustrated embodiment, the first fixing part 34 and the second fixing part 36 are integrally provided with the caliper main body 12 as a single unitary member. At least one of the first fixing part 34 and the second fixing part 36 can, however, be a separate member from the caliper main body 12.

Figure 3:
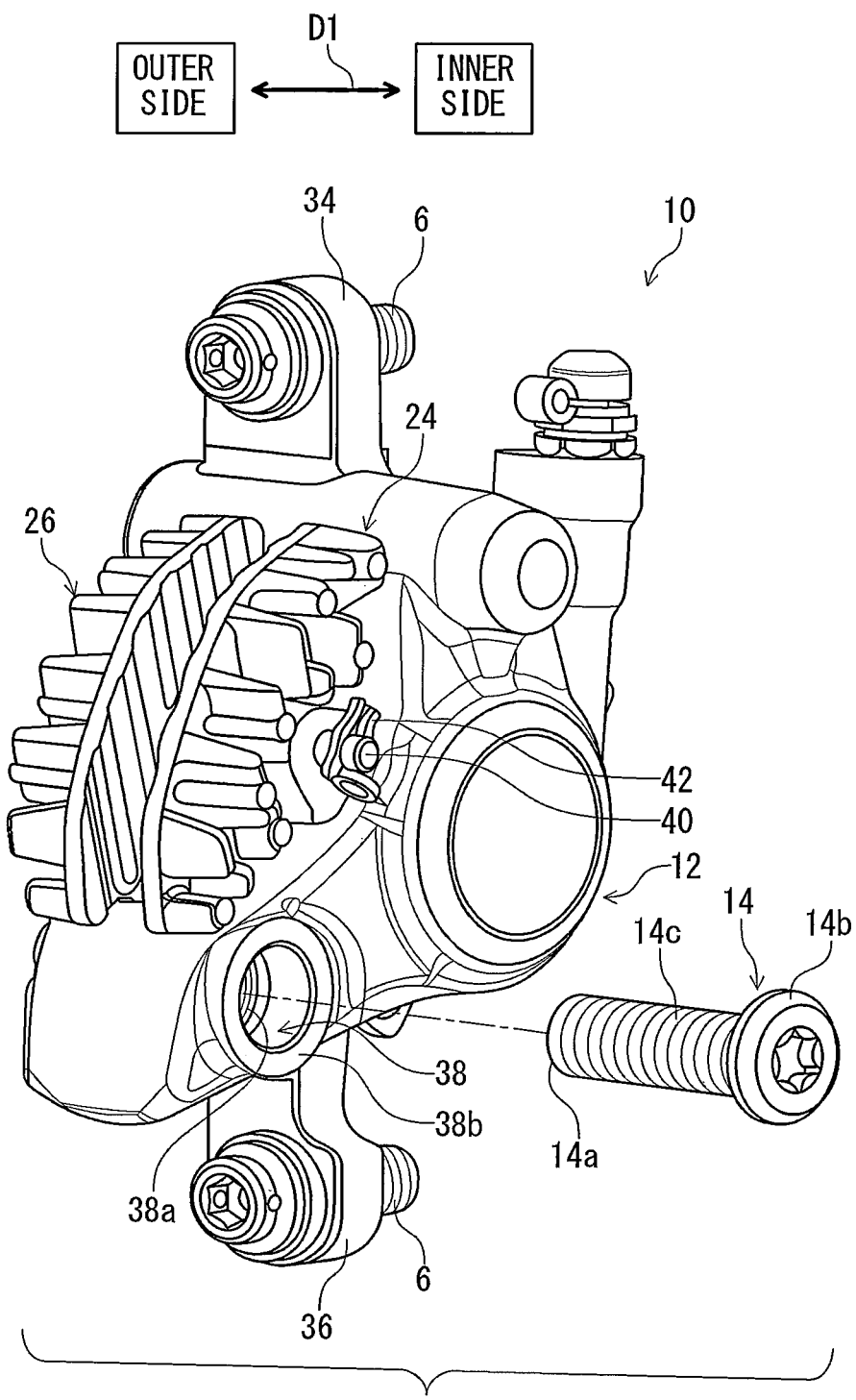
FIG. 3 is a perspective view of the disc brake caliper in accordance with the first embodiment.
Figure 11:
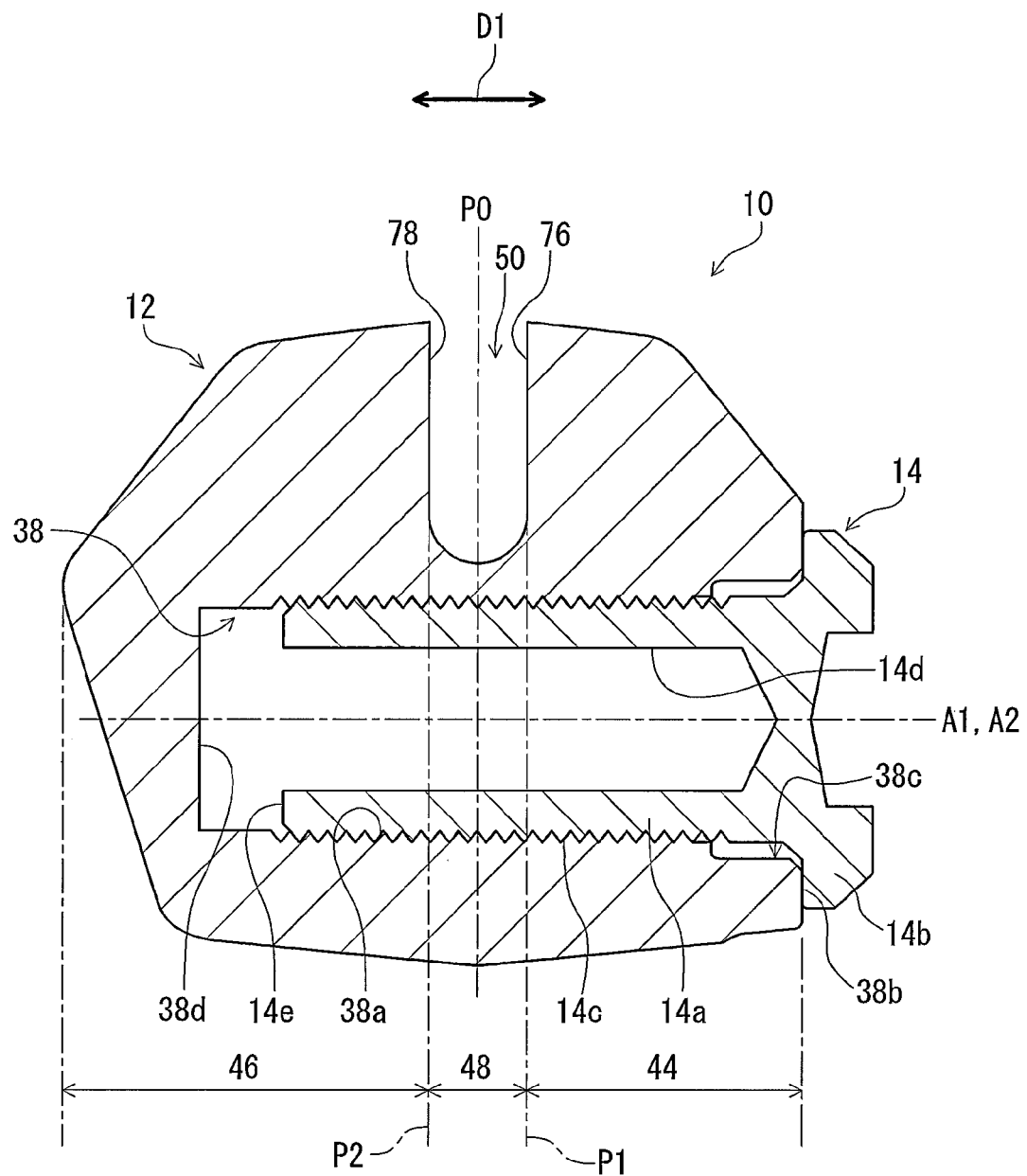
FIG. 11 is a cross-sectional view of the disc brake caliper taken along line XI-XI of FIG. 5.

As seen in FIG. 3, the insert member 14 is a separate member from the caliper main body 12 and is attached to the caliper main body 12. The caliper main body 12 comprises a second hole 38. The insert member 14 is configured to be inserted into the second hole 38. In the illustrated embodiment, the insert member 14 is configured to be detachably inserted into the second hole 38. The insert member 14 includes a shaft portion 14a, a head portion 14b and an external thread 14c. The shaft portion 14a is configured to be inserted into the second hole 38. Further, the shaft portion 14a is configured to be at least partially a cylindrical shape so as to form a cavity 14d therein (FIG. 11). The external thread 14c is provided on an outer periphery of the shaft portion 14a. The head portion 14b is provided at one end of the shaft portion 14a and has an outer diameter greater than an outer diameter of the shaft portion 14a. The second hole 38 includes an internal thread 38a. The insert member 14 is configured to be screwed into the second hole 38. The head portion 14b contacts an annular surface 38b provided around the second hole 38 in a state where the insert member 14 is screwed in the second hole 38. The insert member 14 can be secured to the second hole 38 so as not to be detachable from the second hole 38. For example, the insert member 14 can be bonded to the second hole 38 with adhesive.

The disc brake caliper 10 further comprises a pad pin 40 and a spring clip 42. The pad pin 40 is attached to the caliper main body 12 to movably support the first brake pad 24 and the second brake pad 26. The spring clip 42 is attached to the pad pin 40 to prevent the pad pin 40 from being unintentionally removed from the caliper main body 12. The first brake pad 24 and the second brake pad 26 are movably mounted to the caliper main body 12 along the pad pin 40 and the spring clip 42.

Figure 4:
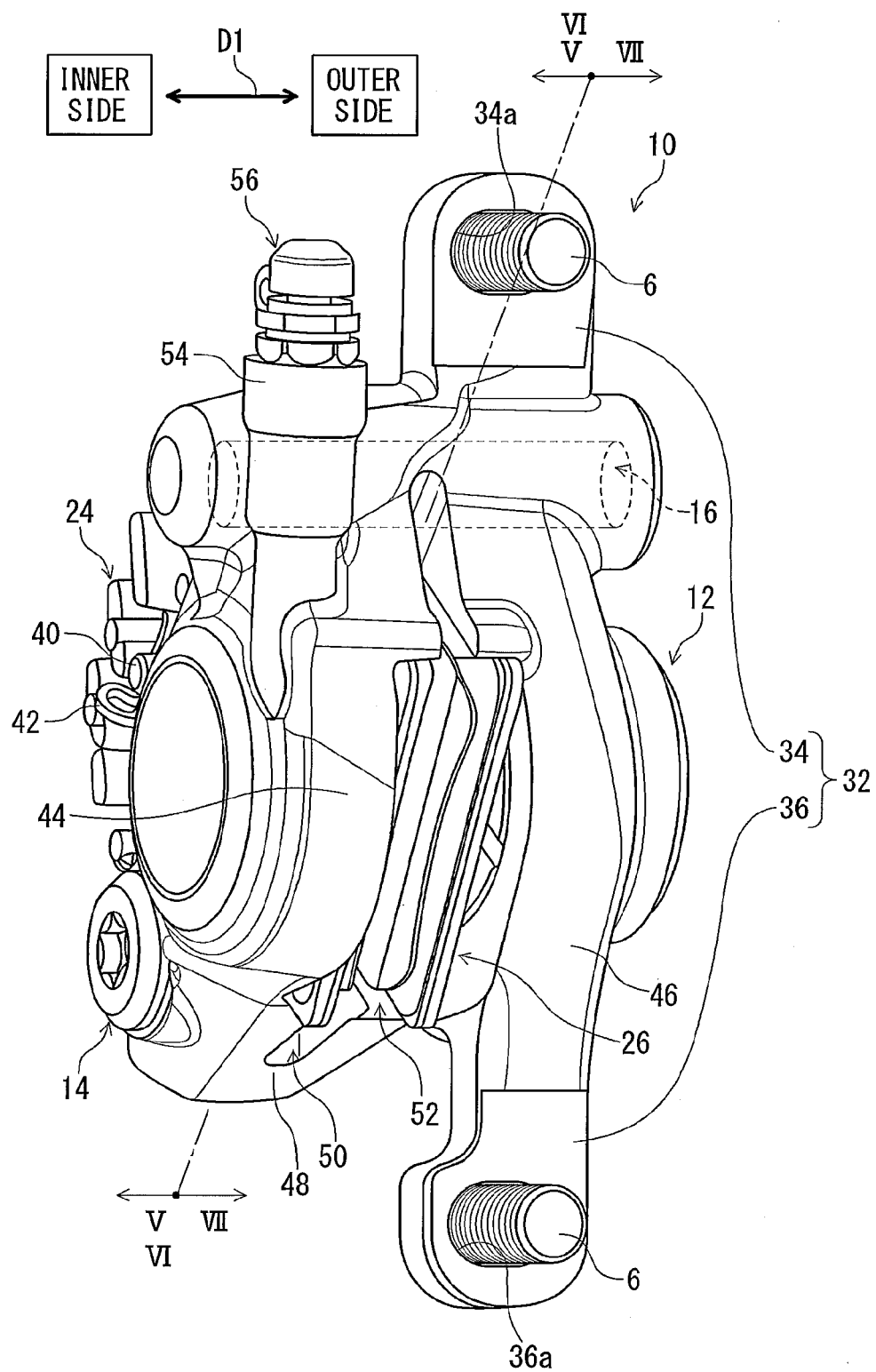
FIG. 4 is a perspective view of the disc brake caliper in accordance with the first embodiment.

As seen in FIG. 4, the caliper main body 12 comprises a first portion (or an inner-side portion) 44, a second portion (or an outer-side portion) 46 and a connecting portion 48. The second portion 46 faces the first portion 44. The connecting portion 48 connects the first portion 44 with the second portion 46 such that a slit 50 for arranging the disc rotor 8 (FIG. 1) is defined between the first portion 44 and the second portion 46. The first portion 44 is closer to the bicycle frame 2 than the second portion 46 in a state where the disc brake caliper 10 is mounted to the front fork 2a. In other words, the first portion 44 is arranged at an inner-side with respect to the second portion 46 and the second portion 46 is arranged at an outer-side with respect to the first portion 44 in a state where the disc brake caliper 10 is mounted to the front fork 2a. The first portion 44 can be arranged at the outer-side with respect to the second portion 46 and the second portion 46 can be arranged at the inner-side with respect to the first portion 44 in a state where the disc brake caliper 10 is mounted to the front fork 2a if needed and/or desired. In this case, the insert member 14 can be seen from the outer-side with respect to the caliper main body 12.

The connecting portion 48, the first portion 44 and the second portion 46 are formed as a single unitary member. The caliper main body 12 is made of a first material. The insert member 14 is made of a second material harder than the first material. In other words, the second material has strength higher than strength of the first material. For example, the second material has elastic modulus higher than elastic modulus of the first material. In the illustrated embodiment, the first material comprises an aluminum alloy. The second material comprises one of iron, titanium and stainless steel. The first material can, however, be materials other than an aluminum alloy, and the second material can be materials other than iron, titanium and stainless steel.

The caliper main body 12 further comprises a through opening 52. The through opening 52 perpendicularly extends with respect to the rotational axis RA in a state where the disc brake caliper 10 is mounted to the front fork 2a. The through opening 52 extends in the first portion 44, the second portion 46 and the connecting portion 48 so as to reach the slit 50. The first brake pad 24 and the second brake pad 26 is arranged at the through opening 52. The first hole 16 extends from the second portion 46 to the first portion 44 at one side with respect to the through opening 52.

As seen in FIG. 4, the fixing portion 32 is provided on the second portion 46. The first fixing part 34 protrudes from the second portion 46 and includes a first through-hole 34a through which the bolt 6 extends. The second fixing part 36 protrudes from the second portion 46 and includes a second through-hole 36a through which the bolt 6 extends. The second fixing part 36 is provided on an opposite side of the first fixing part 34 with respect to the through opening 52. The first fixing part 34 is provided at an upper part of the second portion 46. The second fixing part 36 is provided at a lower part of the second portion 46. In a case where the first portion 44 is arranged at the outer-side with respect to the second portion 46 and the second portion 46 is arranged at the inner-side with respect to the first portion 44, the fixing portion 32 is provided on the first portion 44, for example.

The disc brake caliper 10 further comprises a bleed port 54 to which a bleed nipple 56 is attached. The bleed port 54 is provided on the first portion 44; however, the bleed port 54 can be provided on the second portion 46.

Figure 5:
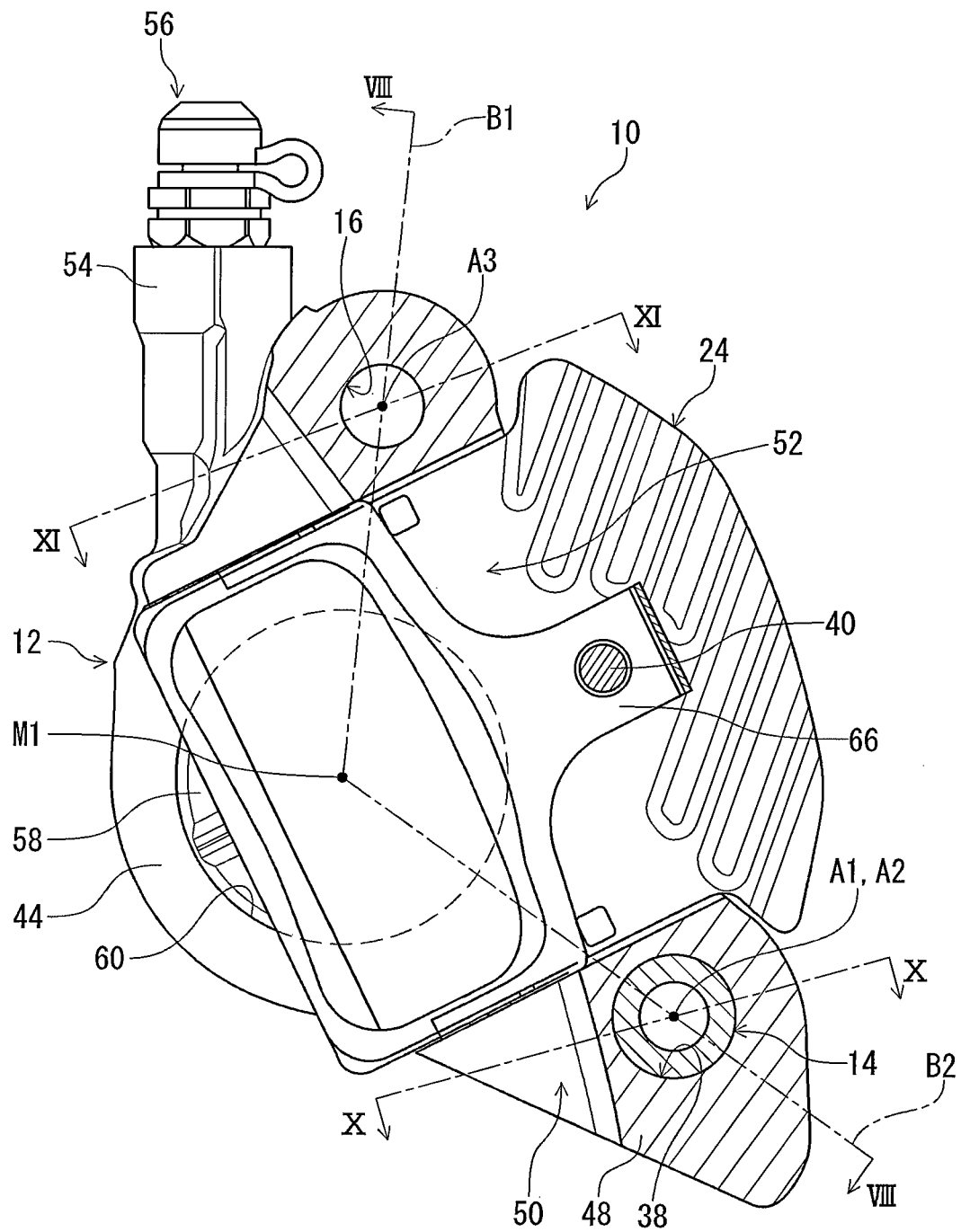
FIG. 5 is a cross-sectional view of the disc brake caliper taken along line V-V of FIG. 4.

As seen in FIG. 5, the second hole 38 has an inner diameter greater than an inner diameter of the first hole 16. The inner diameter of the second hole 38 can, however, be equal to or less than the inner diameter of the first hole 16. The second hole 38 is provided apart from the first hole 16. The second hole 38 is arranged at an opposite side of the first hole 16 with respect to the through opening 52 and the first brake pad 24. In the illustrated embodiment, the second hole 38 is disposed below the first hole 16 and the through opening 52 in a state where the disc brake caliper 10 is mounted to the front fork 2a (FIG. 1).

Figure 6:
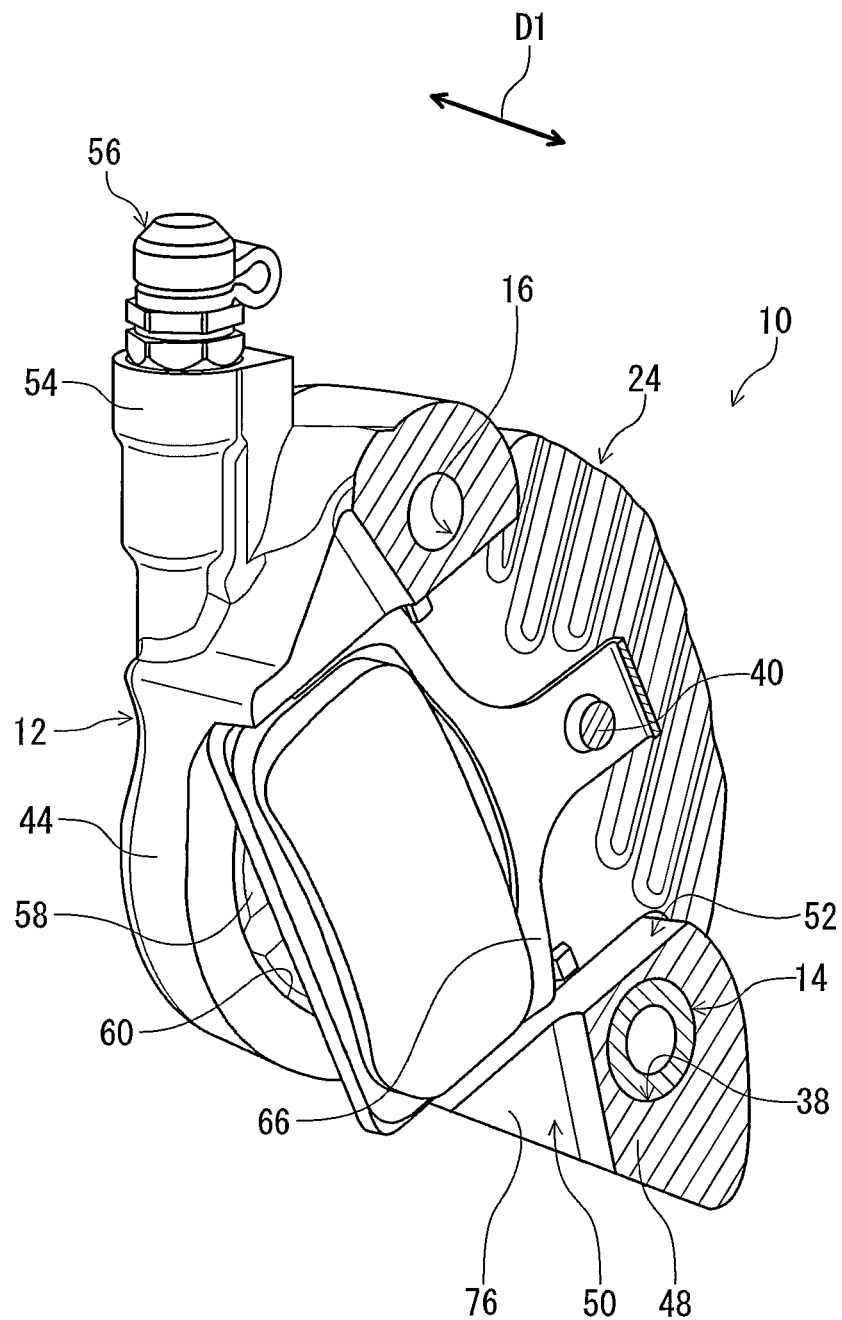
FIG. 6 is a perspective cross-sectional view of the disc brake caliper taken along line VI-VI of FIG. 4.
Figure 7:
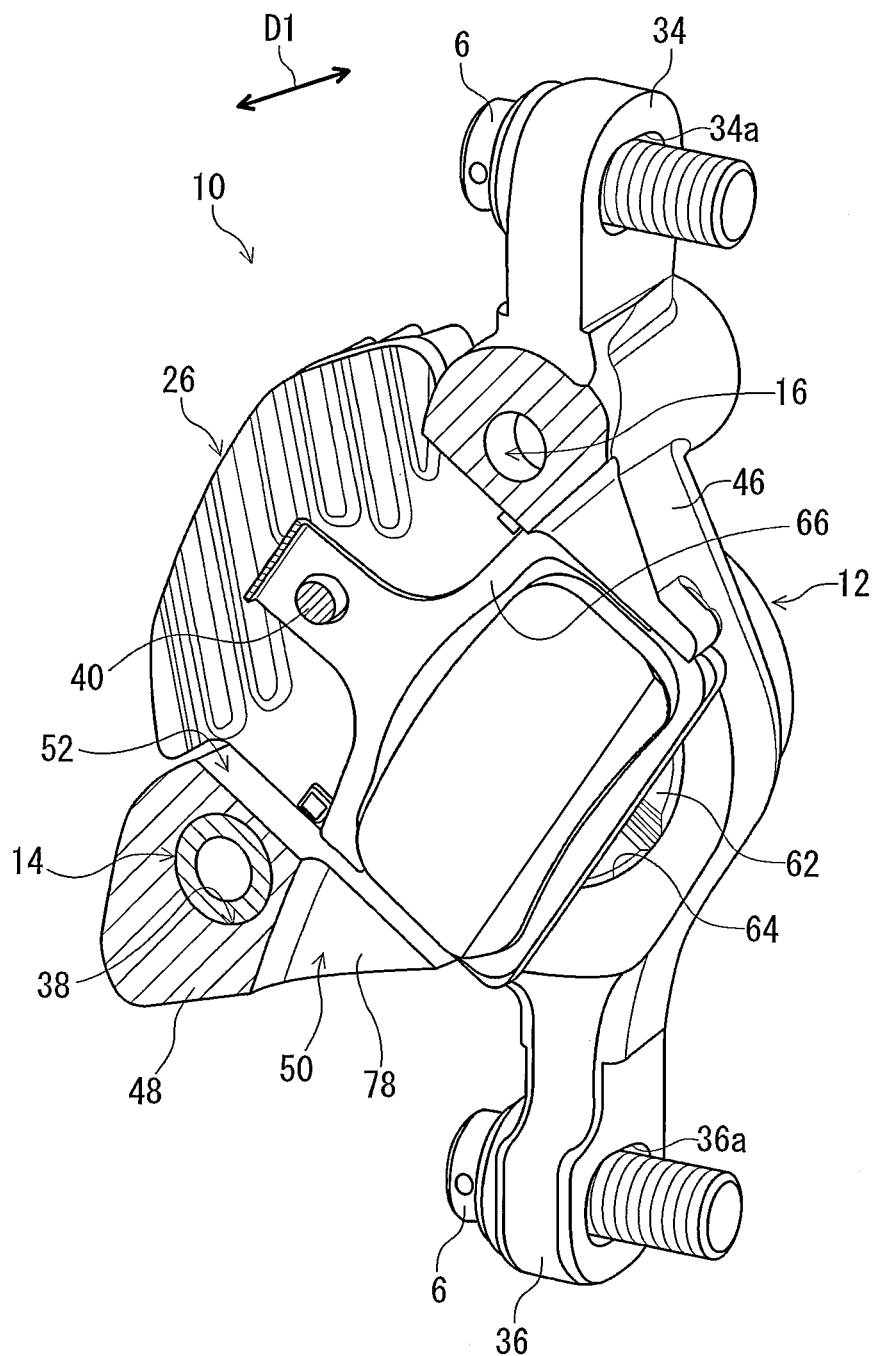
FIG. 7 is a perspective cross-sectional view of the disc brake caliper taken along line VII-VII of FIG. 4.

As seen in FIGS. 6 and 7, the first brake pad 24 and the second brake pad 26 are movably provided in the through opening 52. The through opening 52 is configured to guide the first brake pad 24 and the second brake pad 26 along a movement direction D1 being parallel to the rotational axis RA (FIG. 1).

As seen in FIG. 6. the disc brake caliper 10 includes a first piston 58 configured to press the first brake pad 24 in the movement direction D1 toward the slit 50 and the disc rotor 8 (FIG. 1). The caliper main body 12 comprises a first recess 60. The first recess 60 is provided on the first portion 44 to arrange the first piston 58. The first piston 58 is movably provided in the first recess 60.

As seen in FIG. 7, the disc brake caliper 10 includes a second piston 62 configured to press the second brake pad 26 toward the slit 50 and the disc rotor 8 (FIG. 1). The caliper main body 12 comprises a second recess 64. The second recess 64 is provided on the second portion 46 to arrange the second piston 62. The second piston 62 is movably provided in the second recess 64.

As seen in FIGS. 6 and 7, the disc brake caliper 10 further comprises a biasing member 66 provided between the first brake pad 24 and the second brake pad 26. The biasing member 66 is mounted to the caliper main body 12 using the pad pin 40 to bias the first brake pad 24 and the second brake pad 26 toward the first piston 58 and the second piston 62, respectively.

Figure 8:
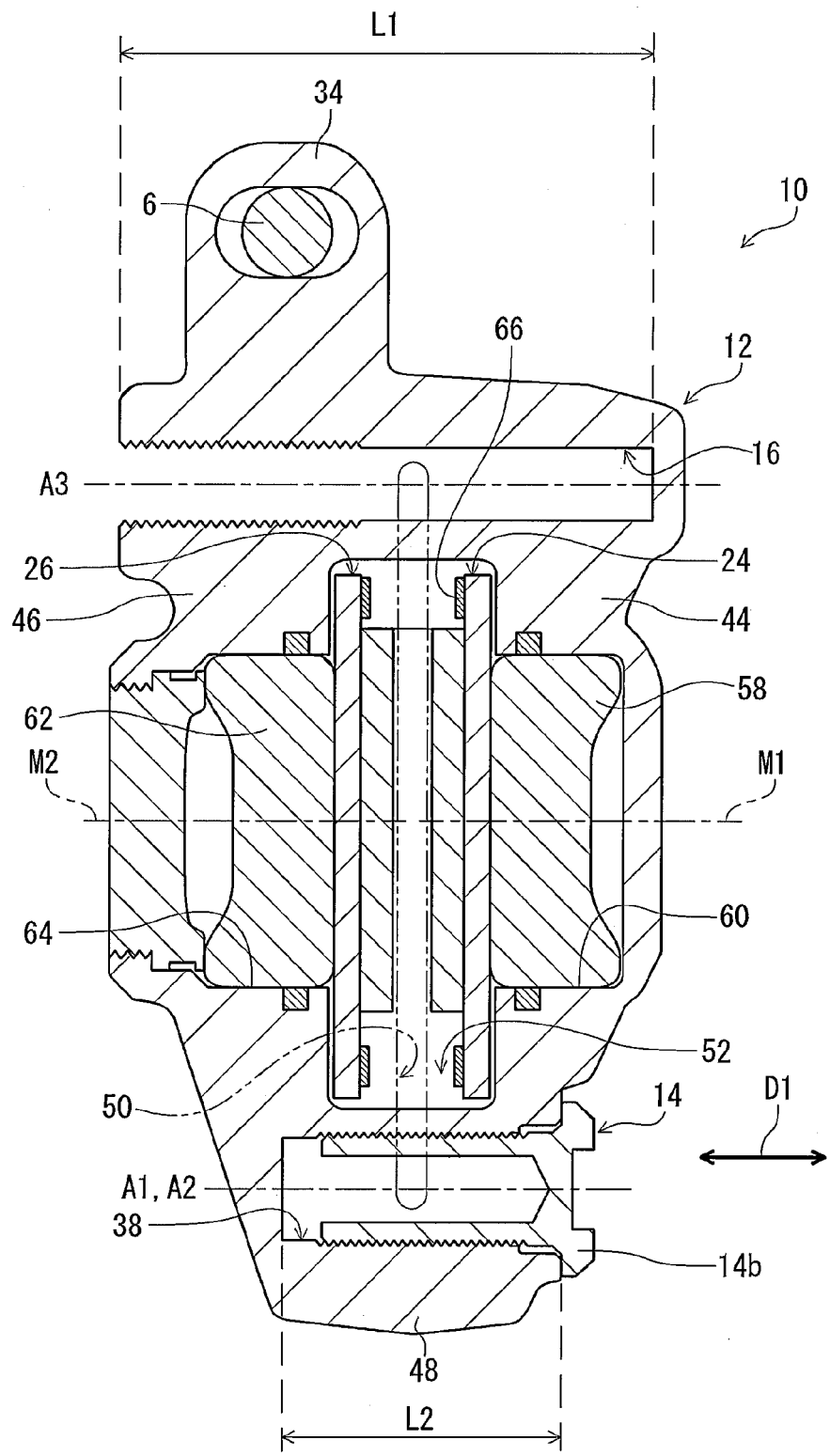
FIG. 8 is a cross-sectional view of the disc brake caliper taken along line VIII-VIII of FIG. 5.

As seen in FIG. 8, the first recess 60 faces the slit 50. The second recess 64 faces the slit 50 and the first recess 60. The first recess 60 is disposed on an opposite side of the second recess 64 with respect to the slit 50. The first brake pad 24 and the second brake pad 26 are provided in the through opening 52 so as to face each other. The first recess 60 defines a first movement axis M1 along which the first piston 58 moves. The second recess 64 defines a second movement axis M2 along which the second piston 62 moves. The second movement axis M2 is coaxial with or parallel to the first movement axis M1. In the illustrated embodiment, the second movement axis M2 is coaxial with the first movement axis M1. The second movement axis M2 does not, however, need to be coaxial with the first movement axis M1 if the second movement axis M2 is parallel to the first movement axis M1. The second hole 38 is configured to be parallel to the first movement axis M1. The first movement axis M1 and the second movement axis M2 are parallel to the movement direction D1. In other words, the first movement axis M1 and the second movement axis M2 are parallel to the rotational axis RA in a state where the disc brake caliper 10 is mounted to the front fork 2a. The first movement axis M1 is defined at a center of the first recess 60. The second movement axis M2 is defined at a center of the second recess 64. Similarly, the insert member 14 is parallel to the first movement axis M1 in a state where the insert member 14 is provided in the second hole 38. The second hole 38 and the insert member 14 do not, however, need to be parallel to the first movement axis M1.

The second hole 38 extends in the movement direction D1 and has a center axis A1. The insert member 14 extends in the movement direction D1 in a state where the insert member 14 is attached to the second hole 38. The insert member 14 has a center axis A2 being coaxial with the center axis A1 in a state where the insert member 14 is provided in the second hole 38. The first hole 16 extends in the movement direction D1 and has a center axis A3. The second hole 38 has a second length L2 less than a first length L1 of the first hole 16. The second length L2 of the second hole 38 can, however, be equal to or greater than the first length L1 of the first hole 16.

As seen in FIGS. 5 to 8, the second hole 38 is arranged at an opposite side of the first hole 16 with respect to the first recess 60 and the second recess 64. The second hole 38 can be arranged at the same side as the first hole 16 with respect to the first recess 60 and the second recess 64. For example, the first hole 16 and the second hole 38 can be provided in the connecting portion 48. As seen in FIG. 5, a first line B1 is defined perpendicular to the center axis A3 of the first hole 16 and the first movement axis M1. A second line B2 is defined perpendicular to the center axis A1 of the second hole 38 and the first movement axis M1 of the first recess 60. In the illustrated embodiment, the first hole 16 and the second hole 38 are arranged such that the first line B1 is disposed at an obtuse angle to the second line B2.

Figure 9:
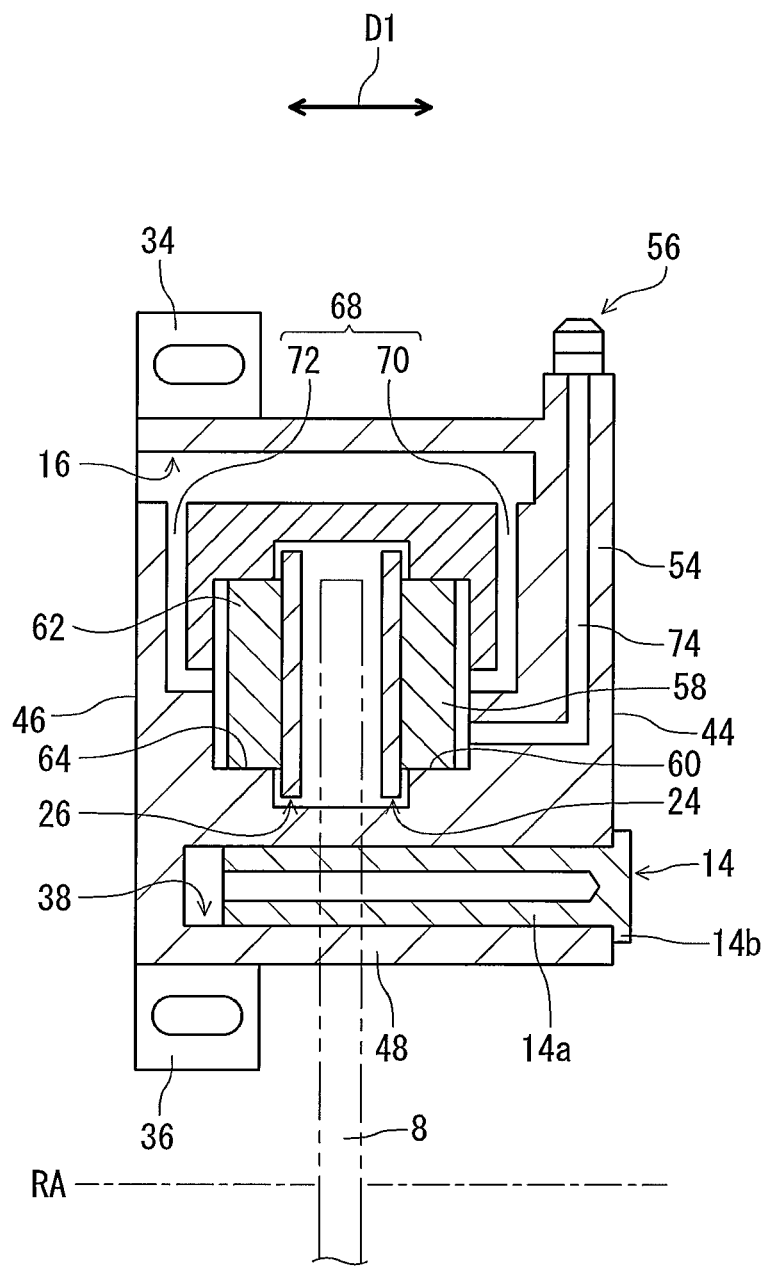
FIG. 9 illustrates an inner structure of the disc brake caliper in accordance with the first embodiment.

As seen in FIG. 9, the caliper main body 12 further comprises a fluid passage 68 connecting the first hole 16, the first recess 60 and the second recess 64. The fluid passage 68 connects the first hole 16 with the first recess 60 and the second recess 64. The fluid passage 68 includes a first fluid passage 70 and a second fluid passage 72. The first hole 16 is configured to be in fluid communication with the first recess 60 via the first fluid passage 70. The first hole 46 is configured to be in fluid communication with the second recess 64 via the second fluid passage 72. The bleed port 54 has a bleed passage 74 configured to be in fluid communication with the first recess 60. In the illustrated embodiment, the second hole 38 is configured without being in fluid communication with the fluid passage 68. Namely, the second hole 38 is not in fluid communication with the first hole 16, the first recess 60 and the second recess 64. The second hole 38 can, however, be in fluid communication with at least one of the fluid passage 68, the first hole 16, the first recess 60 and the second recess 64.

Figure 10:
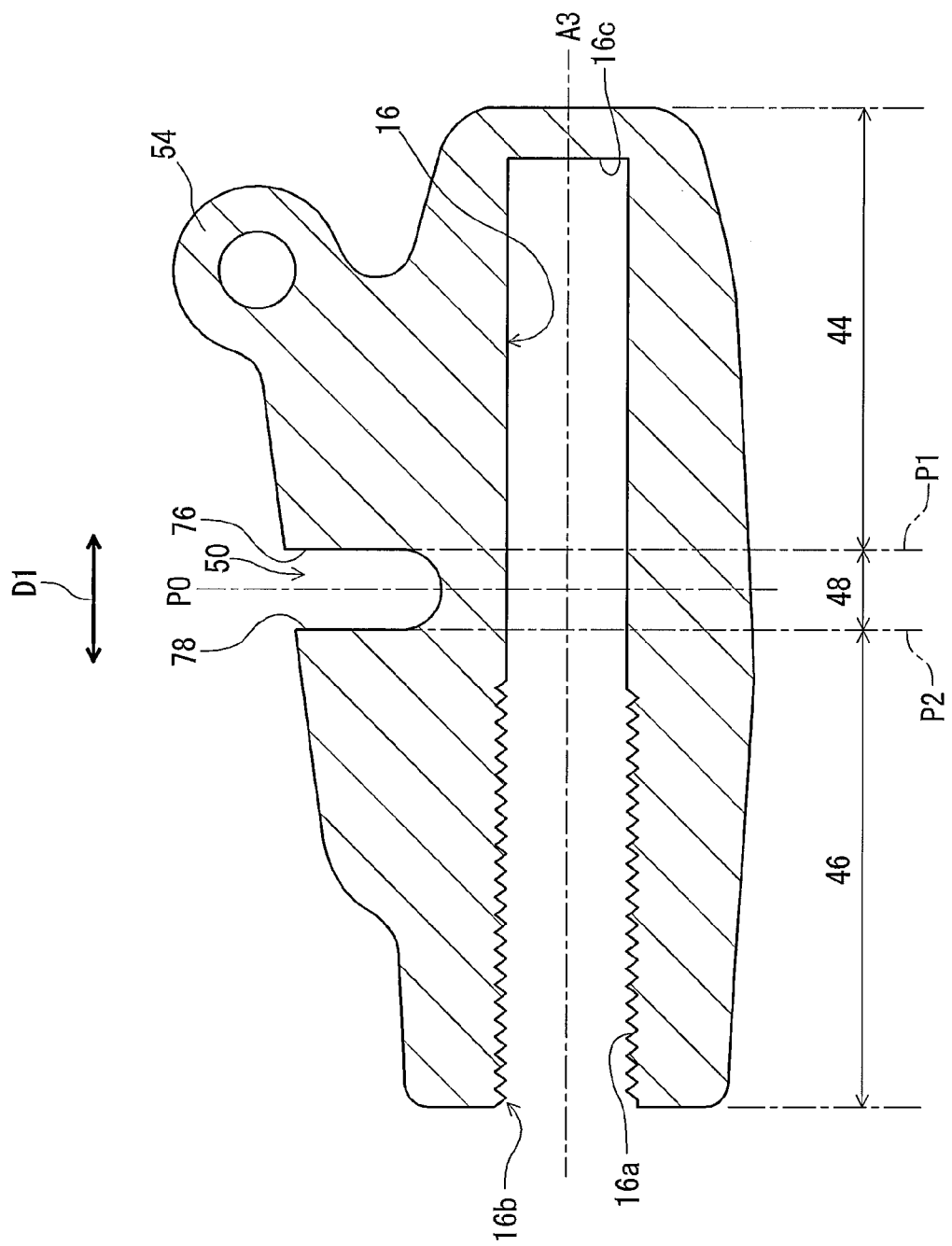
FIG. 10 is a cross-sectional view of the disc brake caliper taken along line X-X of FIG. 5.

As seen in FIG. 10, the first hole 16 extends from the second portion 46 to the first portion 44 so as to overlap the slit 50. More specifically, as seen in FIGS. 6, 7 and 10, the first portion 44 includes an inner surface 76. The second portion 46 includes an inner surface 78 facing the inner surface 76 of the first portion 44. As seen in FIG. 10, the inner surfaces 76 and 78 define a part of the slit 50. A first reference plane P1 is defined on the inner surface 76 of the first portion 44. A second reference plane P2 is defined on the inner surface 78 of the second portion 46. The first reference plane P1 and the second reference plane P2 are parallel to each other.

The first hole 16 extends between the first portion 44 and the second portion 46 through the first reference plane P1, a center plane P0 and the second reference plane P2. The center plane P0 is defined at the slit 50 and divides the slit 50 into halves. More specifically, the center plane P0 is defined to divide the slit 50 into halves in the movement direction D1. The first hole 16 includes an internal thread 16a to which the banjo fixing member 18 is screwed. The first hole 16 includes an inlet opening 16b into which the banjo fixing member 18 is to be inserted. The inlet opening 16b is provided on the second portion 46. The banjo fixing member 18 is attached to the second portion 46 of the caliper main body 12 via the inlet opening 16b of the first hole 16. The first hole 16 includes a bottom 16c opposite to the inlet opening 16b. The bottom 16c is provided in the first portion 44.

As seen FIG. 11, the second hole 38 includes an end opening 38c and a bottom 38d. The end opening 38c is provided on the first portion 44. The bottom 38d is opposite to the end opening 38c. The cavity 14d of the insert member 14 is open toward the bottom 38d of the second hole 38 and extending along the center axis A2. The second hole 38 includes the bottom 38d; however, the second hole 38 can be a throughhole.

The second hole 38 extends from the first portion 44 to the connecting portion 48 so as to at least partially overlap the slit 50 in the connecting portion 48. The insert member 14 extends from the first portion 44 to the connecting portion 48 so as to at least partially overlap the slit 50 in the second hole 38. In the illustrated embodiment, the second hole 38 extends from the first portion 44 to the connecting portion 48 beyond the center plane P0. The insert member 14 extends from the first portion 44 to the connecting portion 48 beyond the center plane P0 in a state where the insert member 14 is provided in the second hole 38. More specifically, the second hole 38 extends from the first portion 44 to the second portion 46 through the connecting portion 48 beyond the slit 50. The insert member 14 extends from the first portion 44 to the second portion 46 through the connecting portion 48 beyond the slit 50 in a state where the insert member 14 is provided in the second hole 38.

As seen in FIGS. 6, 7 and 11, in other words, the second hole 38 extends from the first portion 44 to the second portion 46 beyond the first reference plane P1, the center plane P0 and the second reference plane P2. The insert member 14 extends from the first portion 44 to the second portion 46 beyond the first reference plane P1, the center plane P0 and the second reference plane P2 in a state where the insert member 14 is provided in the second hole 38. More specifically, an end 14e of the insert member 14 is arranged beyond the second reference plane P2.

With the disc brake caliper 10 in accordance with the first embodiment, the second hole 38 extends from the first portion 44 to the connecting portion 48 so as to at least partially overlap the slit 50 in the connecting portion 48. The insert member 14 extends from the first portion 44 to the connecting portion 48 so as to at least partially overlap the slit 50 in the second hole 38. Accordingly, the rigidity of the caliper main body 12 can be adjusted by changing the configuration (e.g., material and/or size) of the insert member 14.

Second Embodiment

A disc brake caliper 210 in accordance with a second embodiment will be described below referring to FIG. 12. The disc brake caliper 210 has the same configuration as the disc brake caliper 10 except for the structure of the insert member. Thus, elements having substantially the same function as those in the first embodiment will be numbered the same here, and will not be described again in detail here for the sake of brevity.

Figure 12:
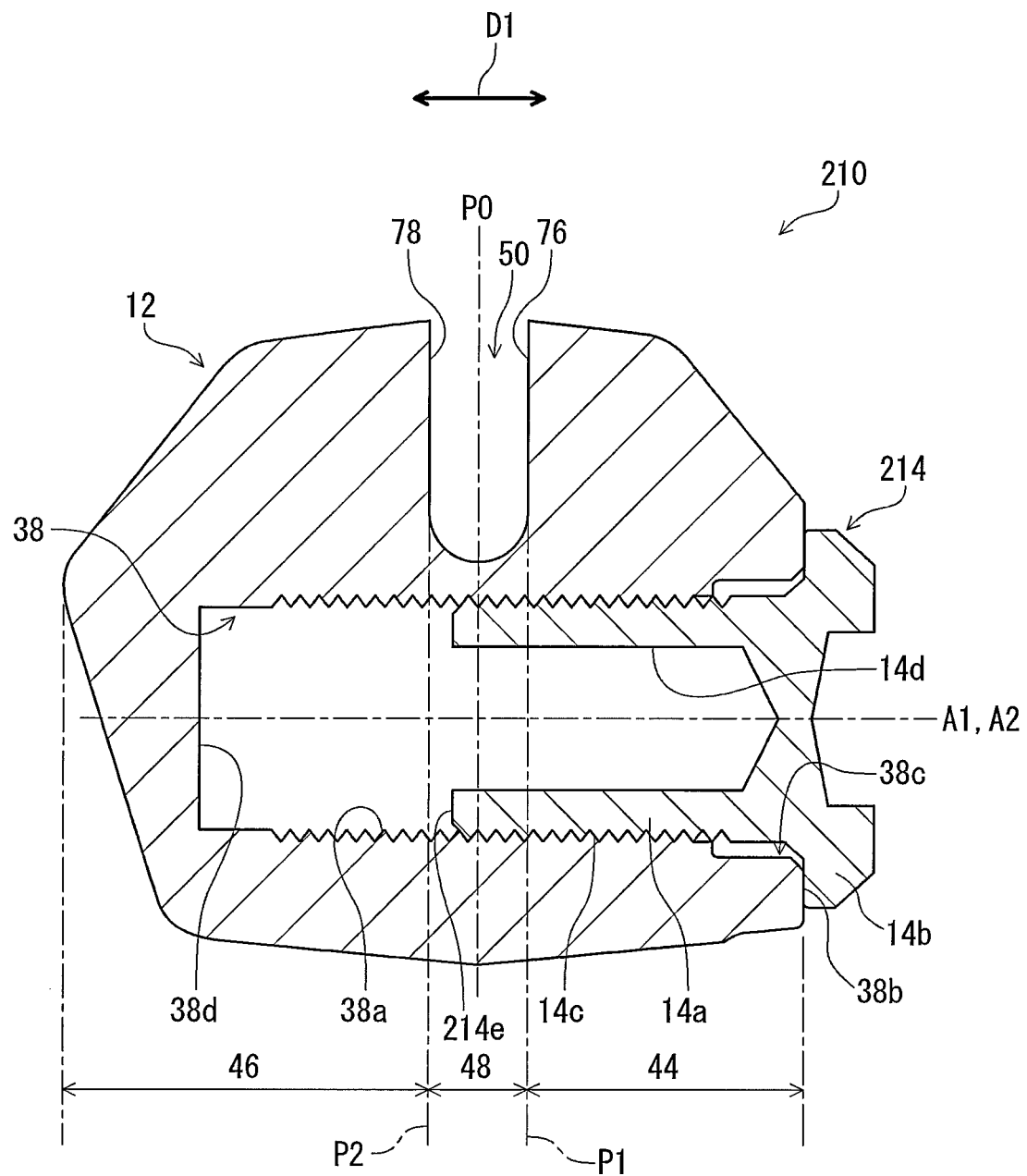
FIG. 12 is a cross-sectional view of a disc brake caliper in accordance with a second embodiment.

As seen in FIG. 12, the disc brake caliper 210 comprises an insert member 214. The insert member 214 has a length shorter than a length of the insert member 14 of the disc brake caliper 10 in the movement direction D1. The insert member 214 extends from the first portion 44 to the connecting portion 48 beyond the center plane P0 in a state where the insert member 214 is provided in the second hole 38. The insert member 214 does not, however, extend from the first portion 44 to the connecting portion 48 beyond the second reference plane P2 in a state where the insert member 214 is provided in the second hole 38. More specifically, an end 214e of the insert member 214 is arranged between the center plane P0 and the second reference plane P2.

With the disc brake caliper 210 in accordance with the second embodiment, the insert member 214 extends from the first portion 44 to the connecting portion 48 so as to partially overlap the slit 50 in the second hole 38. Accordingly, the rigidity of the caliper main body 12 can be adjusted by changing the configuration (e.g., material and/or size) of the insert member 214 as well as the disc brake caliper 10 in accordance with the first embodiment.

Third Embodiment

A disc brake caliper 310 in accordance with a third embodiment will be described below referring to FIG. 13. The disc brake caliper 310 has the same configuration as the disc brake caliper 10 except for the structures of the second hole and the insert member. Thus, elements having substantially the same function as those in the above embodiments will be numbered the same here, and will not be described again in detail here for the sake of brevity.

Figure 13:
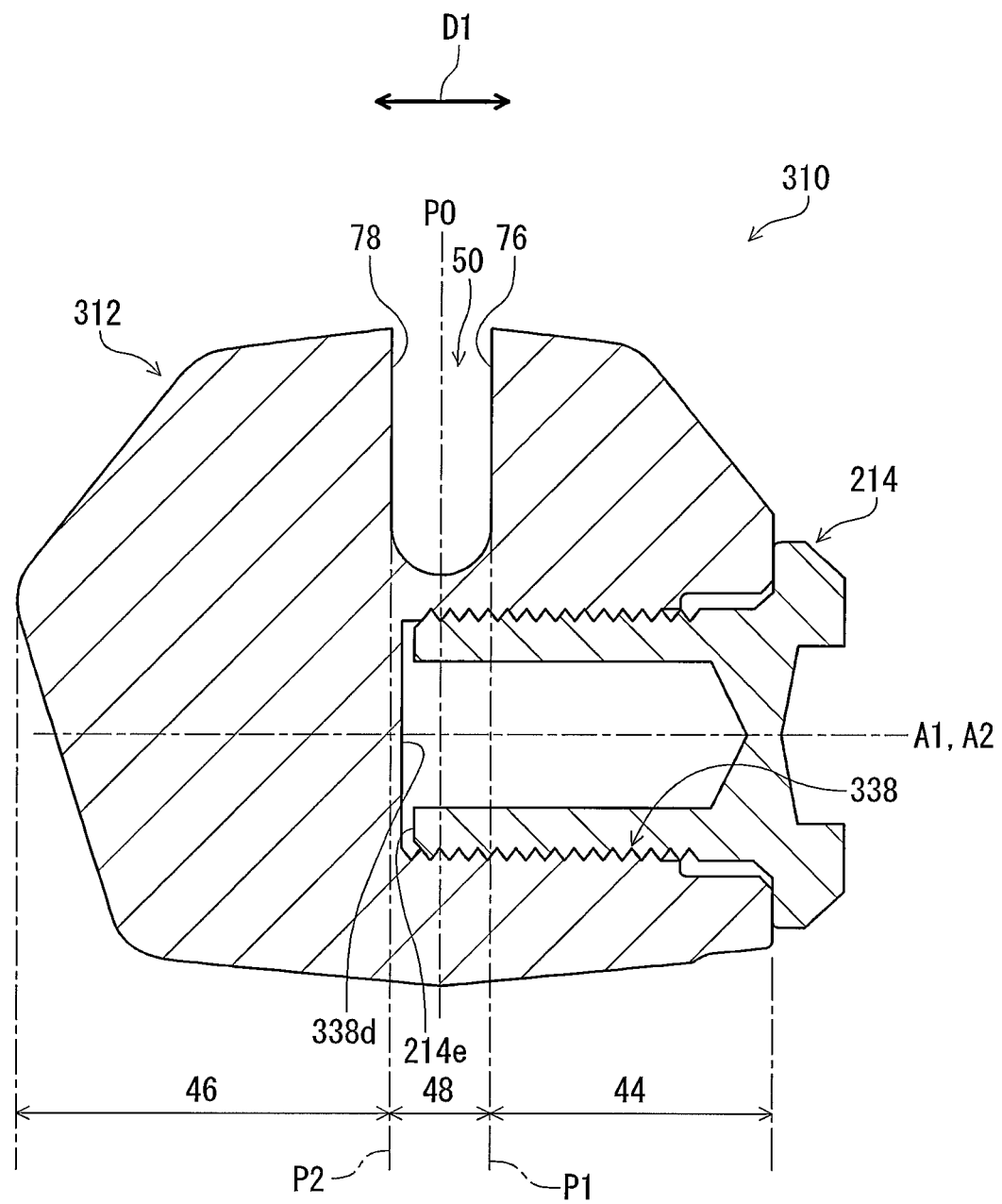
FIG. 13 is a cross-sectional view of a disc brake caliper in accordance with a third embodiment.

As seen in FIG. 13, the disc brake caliper 310 comprises a caliper main body 312. The caliper main body 312 comprises a second hole 338. The second hole 338 has a length shorter than a length of the second hole 38 of the disc brake caliper 10 in the movement direction D1. The second hole 338 extends from the first portion 44 to the connecting portion 48 beyond the center plane P0 defined at the slit 50 and dividing the slit 50 into halves. The second hole 338 does not, however, extend from the first portion 44 to the second portion 46 beyond the slit 50 (i.e., the second reference plane P2). More specifically, a bottom 338d of the second hole 338 is provided between the center plane P0 and the second reference plane P2.

With the disc brake caliper 310 in accordance with the third embodiment, the insert member 214 extends from the first portion 44 to the connecting portion 48 so as to partially overlap the slit 50 in the second hole 338. Accordingly, the rigidity of the caliper main body 312 can be adjusted by changing the configuration (e.g., material and/or size) of the insert member 214 as well as the disc brake caliper 10 in accordance with the first embodiment.

Fourth Embodiment

A disc brake caliper 410 in accordance with a fourth embodiment will be described below referring to FIG. 14. The disc brake caliper 410 has the same configuration as the disc brake caliper 10 except for the structure of the insert member. Thus, elements having substantially the same function as those in the above embodiments will be numbered the same here, and will not be described again in detail here for the sake of brevity.

Figure 14:
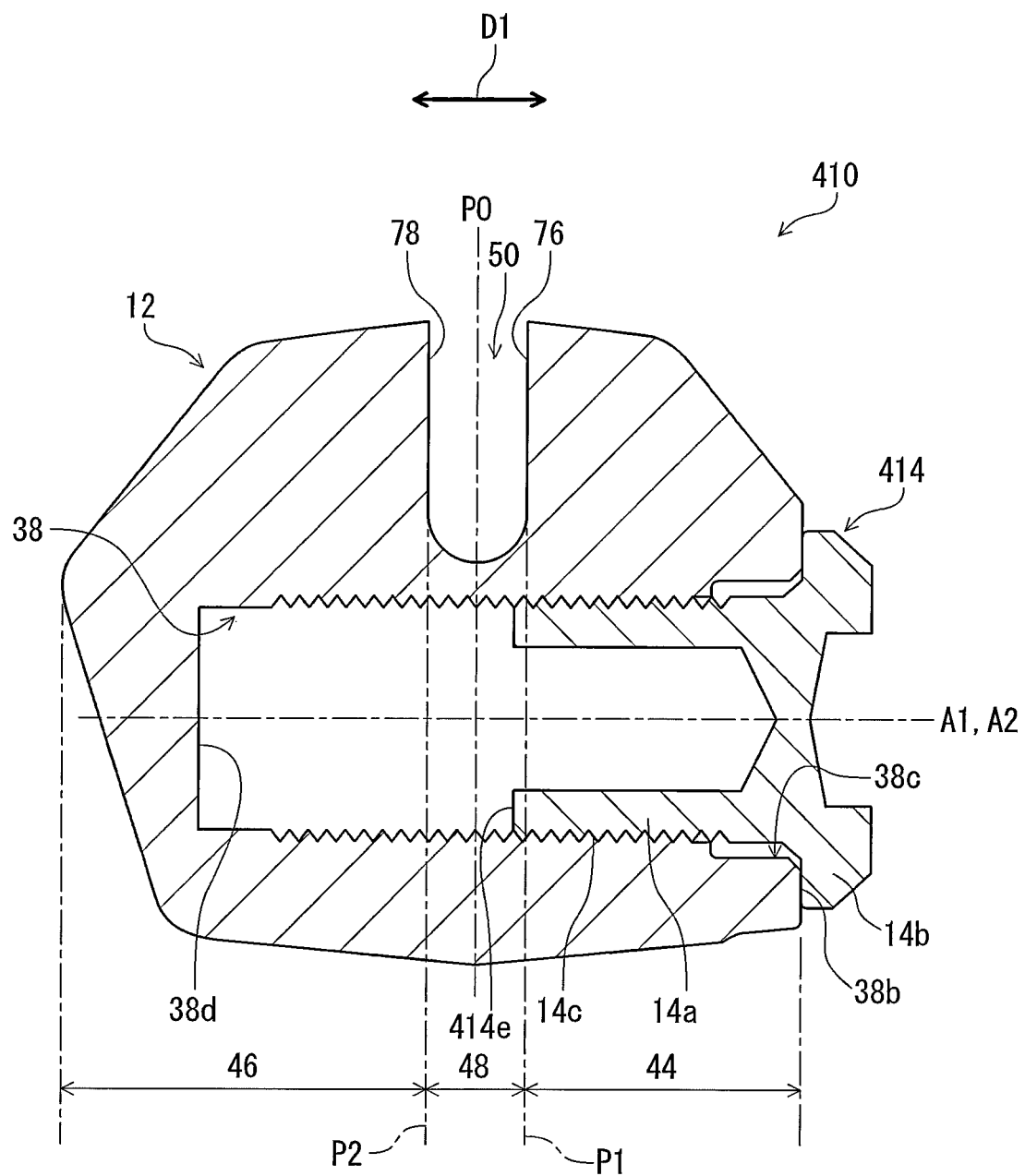
FIG. 14 is a cross-sectional view of a disc brake caliper in accordance with a fourth embodiment.

As seen in FIG. 14, the disc brake caliper 410 comprises an insert member 414. The insert member 414 has a length shorter than the length of the insert member 214 of the disc brake caliper 210 in the movement direction D1. The insert member 414 extends from the first portion 44 to the connecting portion 48 beyond the first reference plane P1 in a state where the insert member 414 is provided in the second hole 38. The insert member 414 does not, however, extend from the first portion 44 to the connecting portion 48 beyond the center plane P0 in a state where the insert member 414 is provided in the second hole 38. More specifically, an end 414e of the insert member 414 is provided between the center plane P0 and the first reference plane P1.

With the disc brake caliper 410 in accordance with the fourth embodiment, the insert member 414 extends from the first portion 44 to the connecting portion 78 so as to partially overlap the slit 50 in the second hole 38. Accordingly, the rigidity of the caliper main body 12 can be adjusted by changing the configuration (e.g., material and/or size) of the insert member 414 as well as the disc brake caliper 10 in accordance with the first embodiment. The insert member 414 in accordance with the fourth embodiment can be combined with the caliper main body 312 in accordance with the third embodiment if needed and/or desired.

Fifth Embodiment

A disc brake caliper 510 in accordance with a fifth embodiment will be described below referring to FIG. 15. The disc brake caliper 510 has the same configuration as the disc brake caliper 10 except for the structures of the second hole and the insert member. Thus, elements having substantially the same function as those in the above embodiments will be numbered the same here, and will not be described again in detail here for the sake of brevity.

Figure 15:
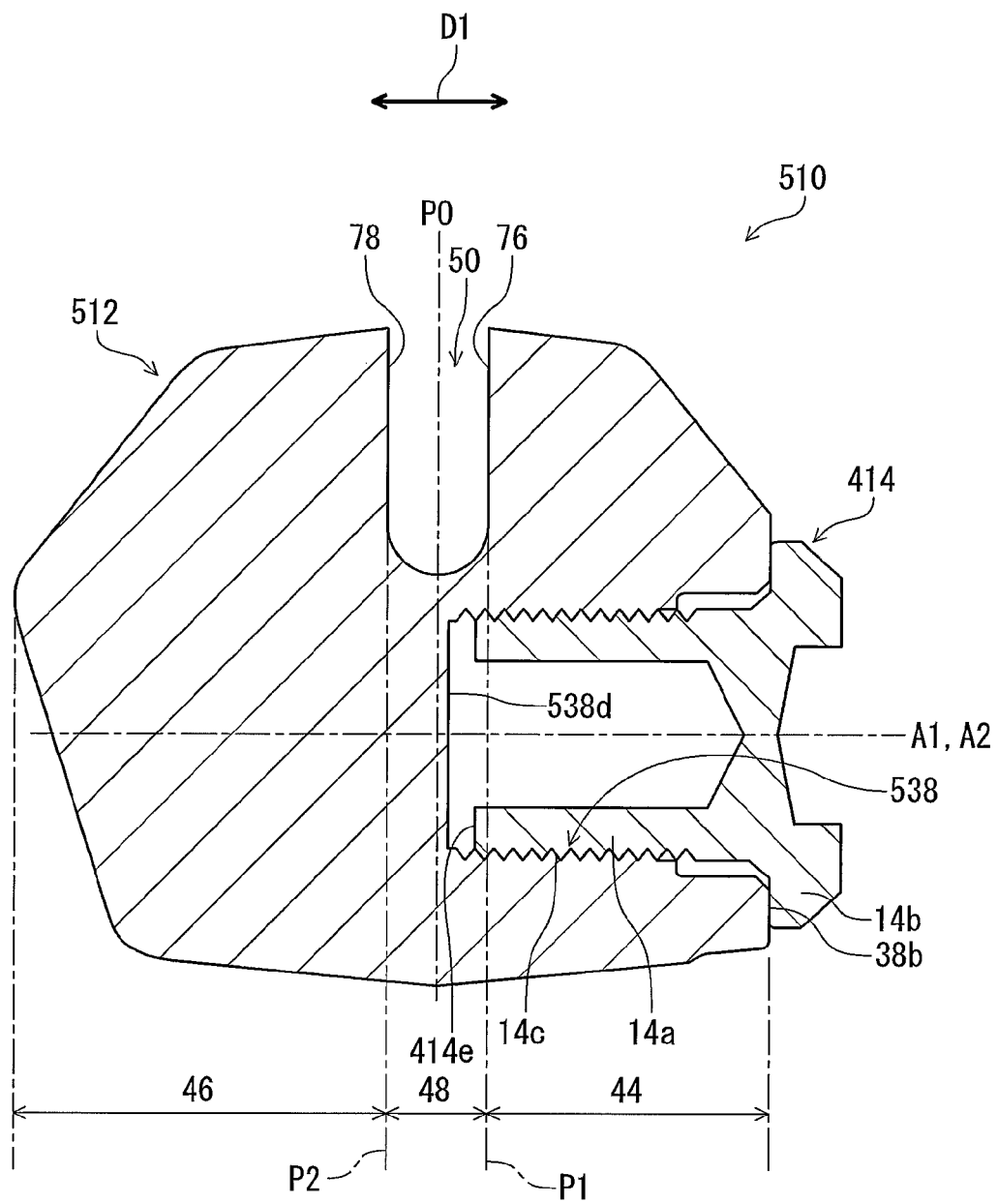
FIG. 15 is a cross-sectional view of a disc brake caliper in accordance with a fifth embodiment.

As seen in FIG. 15, the disc brake caliper 510 comprises a caliper main body 512. The caliper main body 512 comprises a second hole 538. The second hole 538 has a length shorter than the length of the second hole 338 of the disc brake caliper 310 in the movement direction D1. The second hole 538 extends from the first portion 44 to the connecting portion 48 beyond the first reference plane P1. The second hole 538 does not, however, extend from the first portion 44 to the connecting portion 48 beyond the center plane P0. More specifically, a bottom 538d of the second hole 538 is provided between the center plane P0 and the first reference plane P1.

With the disc brake caliper 510 in accordance with the fifth embodiment, the insert member 414 extends from the first portion 44 to the connecting portion 48 so as to partially overlap the slit 50 in the second hole 538. Accordingly, the rigidity of the caliper main body 512 can be adjusted by changing the configuration (e.g., material and/or size) of the insert member 414 as well as the disc brake caliper 10 in accordance with the first embodiment.

Sixth Embodiment

A disc brake caliper 610 in accordance with a sixth embodiment will be described below referring to FIG. 16. The disc brake caliper 610 has the same configuration as the disc brake caliper 10 except for the structures of the second hole and the insert member. Thus, elements having substantially the same function as those in the above embodiments will be numbered the same here, and will not be described again in detail here for the sake of brevity.

Figure 16:
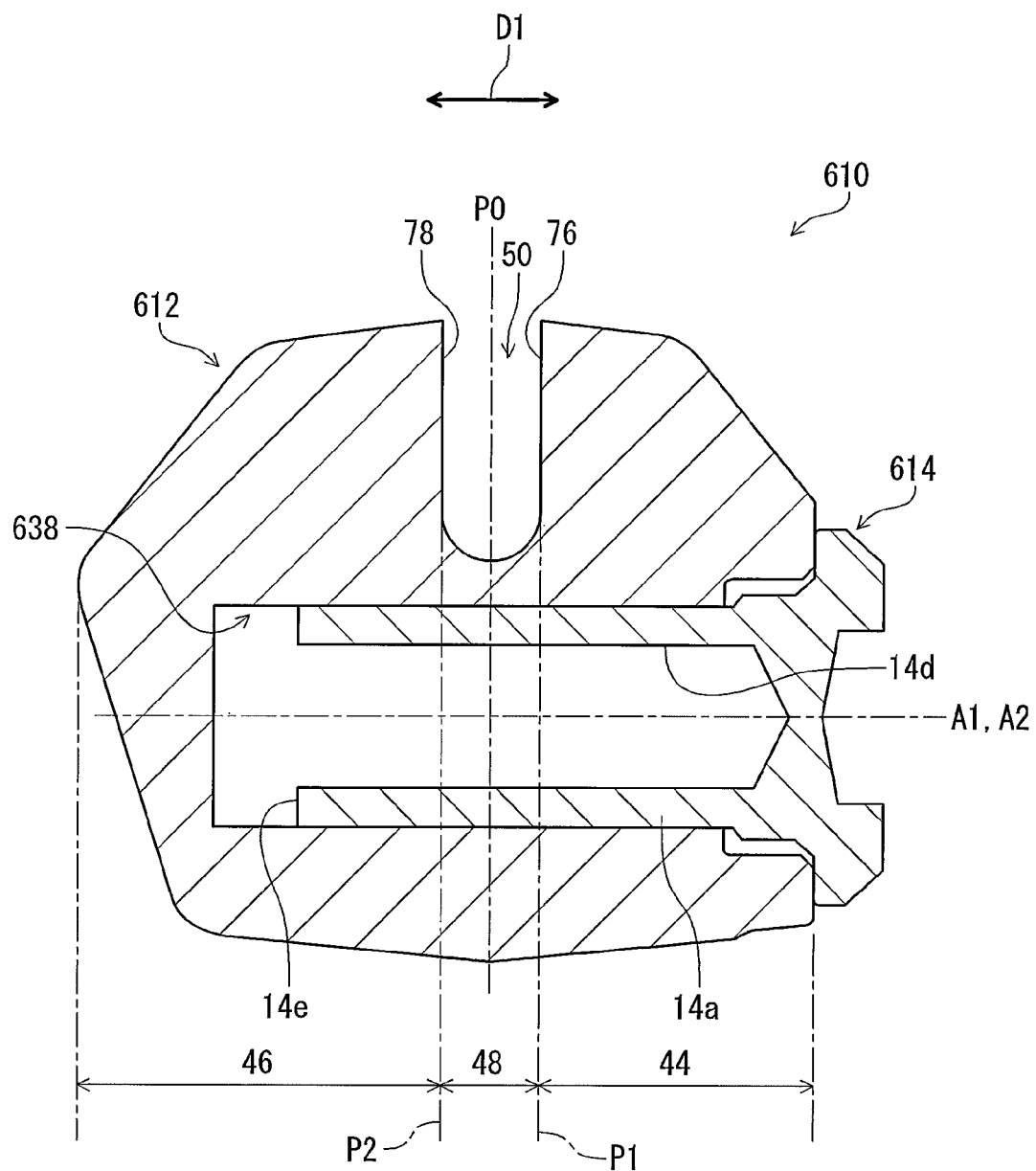
FIG. 16 is a cross-sectional view of a disc brake caliper in accordance with a sixth embodiment.

As seen in FIG. 16, the disc brake caliper 610 comprises an insert member 614. The caliper main body 612 comprises a second hole 638. Unlike the first embodiment, the insert member 614 is free from an external thread, and the second hole 638 is free from an internal thread. In the illustrated embodiment, the insert member 614 is configured to be press-fitted into the second hole 638.

With the disc brake caliper 610 in accordance with the sixth embodiment, the insert member 614 extends from the first portion 44 to the connecting portion 48 so as to at least partially overlap the slit 50 in the second hole 638. Accordingly, the rigidity of the caliper main body 612 can be adjusted by changing the configuration (e.g., material and/or size) of the insert member 614 as well as the disc brake caliper 10 in accordance with the first embodiment.

The structures of the second hole 638 and the insert member 614 in accordance with the sixth embodiment can be applied to the disc brake calipers in accordance with the first to sixth embodiments.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers in the terms "first", "second" or the like recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A disc brake caliper comprising:
    a caliper main body comprising:
        a first portion;
        a second portion facing the first portion;
        a connecting portion connecting the first portion with the second portion such that a slit for arranging a disc rotor is defined between the first portion and the second portion, the connecting portion, the first portion and the second portion being formed as a single unitary member;
        a first hole to which a banjo fixing member is to be attached; and
        a second hole provided apart from the first hole and extending from the first portion to the connecting portion in an axial direction so as to at least partially overlap the slit in the connecting portion when viewed in a direction orthogonal to the axial direction; and
    an insert member configured to be inserted into the second hole, the insert member extending from the first portion to the connecting portion in the axial direction so as to at least partially overlap the slit in the second hole, the second hole being provided outside the slit.

2. The disc brake caliper according to claim 1, wherein the caliper main body is made of a first material, and the insert member is made of a second material harder than the first material.

3. The disc brake caliper according to claim 2, wherein the first material comprises an aluminum alloy, and the second material comprises one of iron, titanium and stainless steel.

4. The disc brake caliper according to claim 1, wherein the second hole extends from the first portion to the connecting portion in the axial direction beyond a center plane defined at the slit and dividing the slit into halves.

5. The disc brake caliper according to claim 4, wherein the insert member extends from the first portion to the connecting portion in the axial direction beyond the center plane in a state where the insert member is provided in the second hole.

6. The disc brake caliper according to claim 4, wherein the second hole extends from the first portion to the second portion through the connecting portion in the axial direction beyond the slit.

7. The disc brake caliper according to claim 6, wherein the insert member extends from the first portion to the second portion through the connecting portion in the axial direction beyond the slit in a state where the insert member is provided in the second hole.

8. The disc brake caliper according to claim 1, wherein the second hole has an inner diameter greater than an inner diameter of the first hole.

9. The disc brake caliper according to claim 1, wherein the caliper main body further comprises
    a first recess provided on the first portion to arrange a first piston, the first recess facing the slit,
    a second recess provided on the second portion to arrange a second piston, the second recess facing the slit and the first recess, and
    a fluid passage connecting the first hole, the first recess and the second recess.

10. The disc brake caliper according to claim 9, wherein the second hole is configured without being in fluid communication with the fluid passage.

11. The disc brake caliper according to claim 9, wherein the first recess defines a first movement axis along which the first piston moves, and
    the second hole is configured to be parallel to the first movement axis.

12. The disc brake caliper according to claim 11, wherein the second recess defines a second movement axis along which the second piston moves, the second movement axis being coaxial with or parallel to the first movement axis.

13. The disc brake caliper according to claim 9, wherein the second hole is arranged at an opposite side of the first hole with respect to the first recess and the second recess.

14. The disc brake caliper according to claim 1, wherein the second hole includes an internal thread, and the insert member includes an external thread and is configured to be screwed into the second hole.

15. The disc brake caliper according to claim 1, wherein the insert member is configured to be press-fitted into the second hole.

16. The disc brake caliper according to claim 1, wherein the insert member is configured to be detachably inserted into the second hole.

17. The disc brake caliper according to claim 1, wherein the second hole includes an end opening which is provided on the first portion, and a bottom opposite to the end opening.

18. The disc brake caliper according to claim 17, further comprising:
a fixing portion provided on the second portion and configured to be detachably fixed to a bicycle frame.

19. The disc brake caliper according to claim 1, wherein the insert member includes a shaft portion configured to be inserted into the second hole and to be at least partially a cylindrical shape.

20. The disc brake caliper according to claim 1, wherein the insert member includes a shaft portion configured to be inserted into the second hole in the axial direction, and the shaft portion is provided outside the slit.

21. The disc brake caliper according to claim 1, wherein the first hole extends in the axial direction.

22. The disc brake caliper according to claim 21, wherein the first hole is provided outside the slit.

23. The disc brake caliper according to claim 1, wherein the slit is provided between the first hole and the second hole.

24. The disc brake caliper according to claim 1, wherein the second hole includes a bottomed hole.

25. The disc brake caliper according to claim 1, wherein the first hole includes a bottomed hole.

26. The disc brake caliper according to claim 9, wherein the fluid passage directly extends from the first hole.

* * * * *